J. R. BROWN & W. A. FOSKETT.
Filters.
No. 137,653.  Patented April 8, 1873.
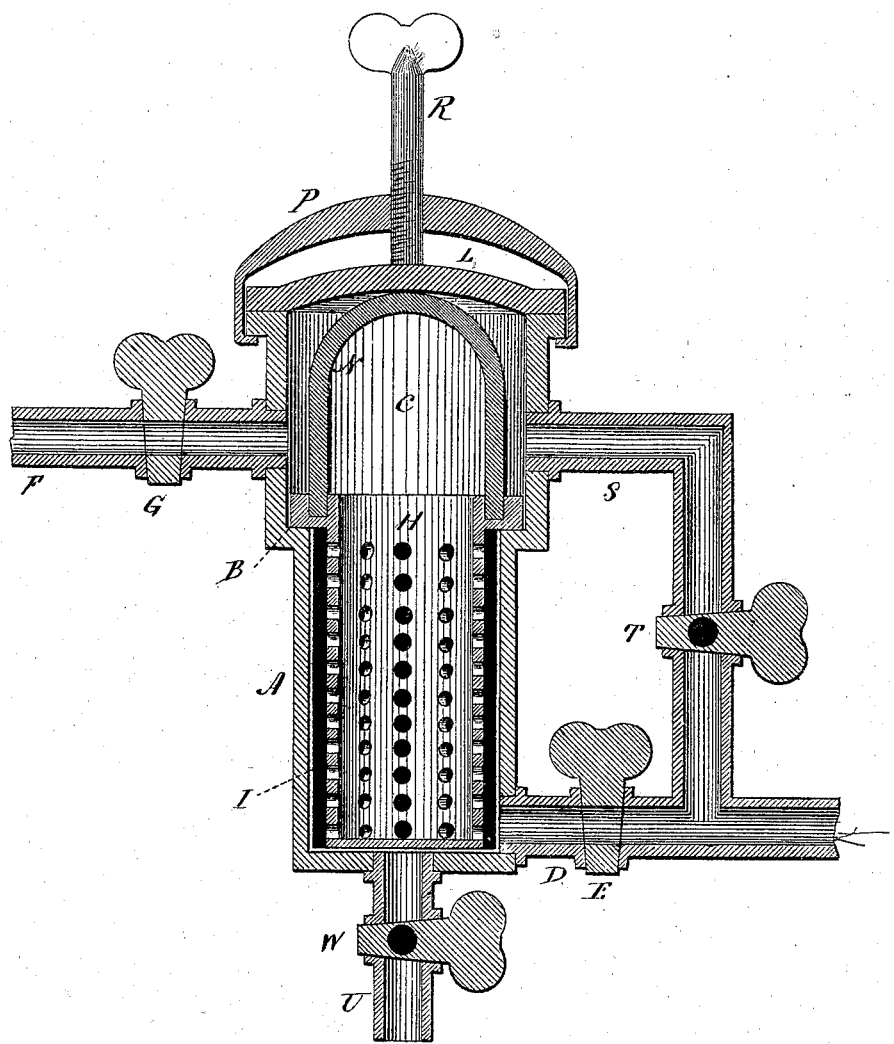
Witnesses.
J H Shumway
A J Tibbits
Joseph R. Brown &
William A. Foskett,
Inventors
By Atty.
John S Earle

United States Patent Office.

JOSEPH R. BROWN AND WILLIAM A. FOSKETT, OF NEW HAVEN, CONN.

IMPROVEMENT IN FILTERS.

Specification forming part of Letters Patent No. 137,653, dated April 8, 1873; application filed March 12, 1873.

*To all whom it may concern:*

Be it known that we, JOSEPH R. BROWN and WILLIAM A. FOSKETT, of New Haven, in the county of New Haven and State of Connecticut, have invented a new Improvement in Filter; and we do hereby declare the following, when taken in connection with the accompanying drawing and the letters of reference marked thereon, to be a full, clear, and exact description of the same, and which said drawing constitutes part of this specification, and represents a vertical central section.

This invention relates to an improvement in filters, for filtering water or other fluids, constructed with special reference to feed-water heaters for steam-boilers; and the improvement consists in a chamber, cylindrical or other form, having a perforated cylinder arranged therein of less diameter than the main cylinder, and so as to leave a space between the two, and the exterior of the inner cylinder covered by a coat of felt or similar material, through which the water will freely pass under pressure, and the main cylinder provided with an inlet to admit the water into the space between the two cylinders, and with an outlet from above or within the internal cylinder, so that the water passing through the felt or filtering material will flow freely to the outlet, all as more fully hereinafter described.

A is the main cylinder, constructed of larger diameter at the upper portion so as to form a shoulder or ledge, as at B, and to form a chamber, C, in the upper portion. Into the cylinder near the bottom a pipe, D, leads, provided with a cock, E, for the inlet. From the chamber C the outlet-pipe F, provided with a cock, G, leads. Within the lower portion of the cylinder, and supported upon the shoulder B, an internal cylinder, H, is set, of less diameter than the cylinder A, so as to leave a space between the two. This cylinder H extends nearly to the bottom of the cylinder A, and the cylinder H is perforated with numerous holes, as seen in the drawing, and around the outside of this cylinder a coating or casing of felt or other material, I, as denoted in solid black, which will serve the purpose of a filtering material, is placed. Over the top of the main cylinder a cap, L, is placed to close the cylinder and, at the same time, to hold the internal cylinder in its place, which is done by a yoke or projection, N, extending from the cylinder H up to the cap, the cap preferably held in place by a yoke, P, and set-screw R.

The cocks F and G being open, the water enters through the inlet D, passes through the filtering material, through the perforations in the cylinder H, thence up and off through the outlet E to the boiler or other place for use.

To cleanse or wash the filter, if at any time it be desirable so to do, (and this should be frequently done,) an inlet-pipe, S, leads to the chamber C above the cylinder H, and is provided with a cock, T, and from the main cylinder, at or near the bottom, an outlet-pipe, U, provided with a cock, W, is arranged. Close the cocks F G, open the cocks T W; the water will flow within the cylinder H, passing through the perforations in the cylinder; thence through the filtering material on the outside in reverse direction to the regular flow; thence down through the outlet U until the filtering material has been thoroughly cleansed; then the cocks T and W are closed and the cocks F and G reopened to allow the flow as before.

By this construction the most perfect filtration is attained and the cleansing of the filtering material readily performed without removing it or in any way changing its position.

We claim as our invention—

The herein-described filter, consisting of the cylinder A, the perforated cylinder H, supported within the cylinder A and so as to leave a space between the two, which space is filled, or partially so, with felt or other filtering material, and with a chamber, C, above the cylinder H, a main inlet, D, and outlet F, a cleansing-inlet, S, an outlet, U, provided with cocks to cut off or open the flow, substantially as set forth.

JOSEPH R. BROWN,
WM. A. FOSKETT.

Witnesses:
J. H. SHUMWAY,
A. J. TIBBITS.